Aug. 22, 1933.　　　O. A. THRONDSEN　　　1,923,341
COOKING UTENSIL
Filed March 18, 1931
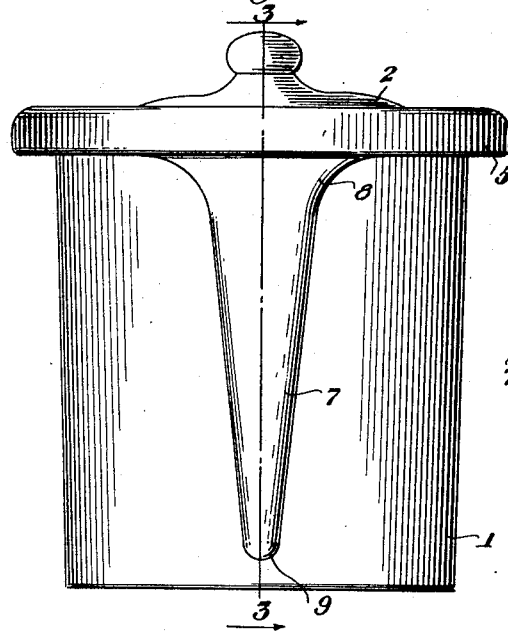
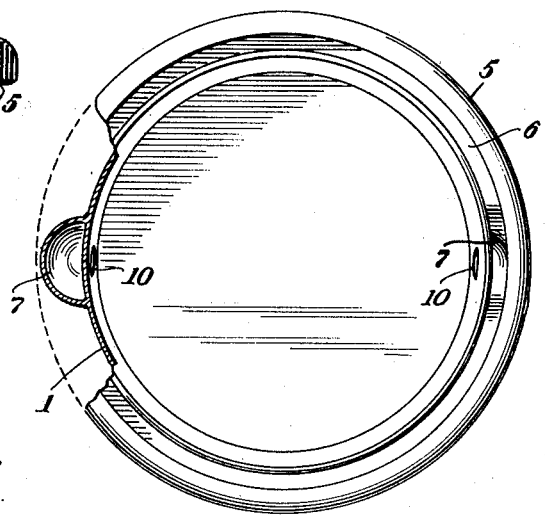
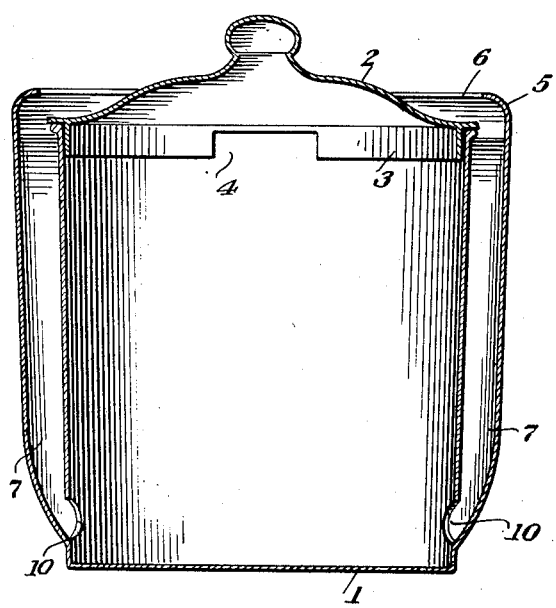
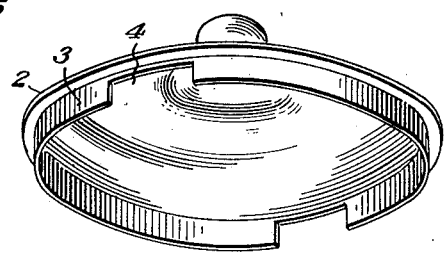
Otto A. Throndsen
INVENTOR
BY Victor J. Evans and Co.
ATTORNEYS Patented Aug. 22, 1933

1,923,341

UNITED STATES PATENT OFFICE 1,923,341

COOKING UTENSIL

Otto A. Throndsen, Groton, Conn.

Application March 18, 1931. Serial No. 523,529

1 Claim. (Cl. 53—1)

My present invention has reference to a pot or like utensil in which foodstuffs, such as vegetables, granular materials, etc., are cooked by boiling or in which water is to be boiled, and the primary object of the invention is the provision of a utensil for this purpose of such construction as to prevent the overflow of the fluid, incident to the boiling over thereof.

To the attainment of the foregoing and many other objects which will present themselves, the improvement also resides in certain other novel features of construction, combination and operative association of parts, one satisfactory embodiment of which is disclosed by the accompanying drawing.

In the drawing:

Figure 1 is a side elevation of a utensil in accordance with this invention.

Figure 2 is a top plan view thereof, with parts broken away and parts in section.

Figure 3 is a sectional view approximately on the line 3—3 of Figure 1.

Figure 4 is a perspective view looking toward the under face of the lid or cover.

Before proceeding with a detailed description of the invention it is well to state that utensils used in preparing food by boiling and in which the fluid contains mostly water, the same is susceptible to boiling over the top of the utensil. This not only results in the destruction of the food but frequently is the occasion of destructive fires, explosions and deaths, caused by the water boiling over the utensil and extinguishing the source of heat, especially when the utensil is placed on a gas range, the overflow extinguishing the flames, permitting a flow of non-lighted gas and the poisonous effects therefrom. In addition to this such overflow soils and frequently renders useless the utensil and not only soils but frequently irreparably damages the cooking range. My improvement, it will be noted, will overcome such overflow of boiling fluid. As it is well known, water when boiling expands in the creation of steam, the expansion starting from the bottom of the vessel and ascending to the top surface of the water in bubbles where the bubbles burst into steam. If the pot used is covered at the top, the steam generated will cause enough pressure to lift the lid slightly from the rim of the pot, causing the steam to flow in a horizontal plane from the pot in all directions. When very violent boiling takes place the entire content expands into a state of foam, filling the pot to full capacity and causing the contents to flow over the rim or mouth of the utensil. From practical experience I have found that such steam and foam can be condensed into water of slightly low temperature and conducted back into the bottom of the utensil by only a slight change in the design of the present type of cooking utensils. This I obtain by the construction of the pot or utensil illustrated by the drawing.

Referring to the drawing in detail the numeral 1 designates a cooking pot or utensil of the ordinary size and construction. The mouth of this pot is closed by a lid or cover 2, the same being provided with the usual depending angular flange 3 and in the present instance the flange 3 is notched or cut-away at determined spaced intervals as indicated in the drawing by the numeral 4. Also in the present instance the pot, above the mouth thereof, has attached thereto and is surrounded by a ring 5. The ring is substantially cross sectionally U-shaped, the lower edge of which being attached or formed with the pot 1 and the upper opening 6 therethrough is of a size to permit of the insertion or removal of the lid or cover 2. Preferably integrally formed with the under face of the ring there are any desired number of ducts 7. The ducts may be formed of the same material as the pot and ring. As disclosed by the drawing the ducts, while approximately semi-circular in cross section, are gradually tapered from their widened ends 8 that are connected with the ring 5 to their lower ends 9 which terminate only a short distance above the closed bottom of the utensil 1. The edges of the ducts are, of course, either formed with or securely fixed to the outer periphery of the pot or utensil 1, and the said utensil 1 is provided with ports or openings 10 that communicate with the bottom portions of the ducts 7.

The ring 5, extending above the mouth of the pot or utensil 1, provides a condensing ring. With a pot or utensil constructed as above described, and containing water and employing coal, gas, oil or wood as the heating elements for the stove or range upon which the pot is placed, it will be found when the substance in the pot has started to boil ordinarily and then caused to boil more rapidly so that the same boils over the mouth of the pot or utensil the contents will flow into the condenser ring 5. The temperature in the condenser ring, owing to its position over the top of the pot or utensil is considerably lower than that of the boiling fluid and such fluid when striking the surface of the condenser ring is rapidly condensed to its original form and drains back through the ducts to the bottom of the pot. If the lid or cover 2 is employed, as is true in most cases, the steam or water flowing over the upper edge and under the cover strikes the comparatively cool surface of the condenser ring or rim and rapidly condenses and drains back through the ducts into the utensil. When using an ordinary pot with or without a cover the steam will condense after leaving the pot and become lost in the atmosphere and the more solid matter will run alongside of the pot, causing damage to the heating element in electric stoves, extinguishing flames in gas and oil stoves and creating an unhealthy vapor and odor regardless of which type of heating apparatus is employed. By notching the flange 3 certain quantities of boiling fluid will pass through these notches into the condensing chamber without moving the top or cover 2 entirely off of the mouth of the pot or vessel.

While in the drawing I have illustrated the improvement formed with a pot or like cooking vessel it will be apparent that the improvement may be constructed separtely therefrom and attached thereto, as the improvement pertains to all types of cooking utensils regardless of shape or size and the condenser ring may be designed and placed to best suit each particular purpose.

The ducts for the drain may be varied in number, size, etc., to best suit the purpose of my invention and likewise for the convenience of the cleaning of the utensil. The comparatively cooled fluid reentering the pot through the ducts will prevent material in the pot from sticking to the bottom thereof and will likewise prevent the burning of the bottom of the pot.

Having described the invention, I claim:

A device for boiling food stuffs comprising a utensil having openings arranged in its side wall adjacent to the bottom thereof, a flanged cover for the utensil with notches arranged in diametrically opposite sides of the flange thereof, tapered ducts having their lower small ends communicating with the openings, a cross sectional U-shaped condenser ring formed on the upper enlarged ends of the ducts and surrounding the upper end of the utensil with its upper edge disposed in a plane above the upper end of the utensil for arrangement in the path of matter expelled through the notches of the flange, but spaced outwardly therefrom to allow for the passage of the cover.

OTTO A. THRONDSEN.